United States Patent
Adkins et al.

(10) Patent No.: US 10,563,129 B2
(45) Date of Patent: *Feb. 18, 2020

(54) USE OF COOLING MEDIA IN BIOMASS CONVERSION PROCESS

(71) Applicant: INAERIS TECHNOLOGIES, LLC, Pasadena, TX (US)

(72) Inventors: Bruce Adkins, League City, TX (US); Lorenz J. Bauer, Pasadena, TX (US); Ronald Cordle, League City, TX (US); Richard A. Engelman, Houston, TX (US); J. Christopher Lewis, Houston, TX (US)

(73) Assignee: Inaeris Technologies, LLC, Pasadena, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/763,043

(22) PCT Filed: Sep. 23, 2016

(86) PCT No.: PCT/US2016/053440
§ 371 (c)(1),
(2) Date: Mar. 23, 2018

(87) PCT Pub. No.: WO2017/053796
PCT Pub. Date: Mar. 30, 2017

(65) Prior Publication Data
US 2019/0085248 A1    Mar. 21, 2019

Related U.S. Application Data

(60) Provisional application No. 62/233,096, filed on Sep. 25, 2015.

(51) Int. Cl.
*C10G 1/08* (2006.01)
*C10B 49/22* (2006.01)
(Continued)

(52) U.S. Cl.
CPC ............... *C10G 1/08* (2013.01); *C10B 49/22* (2013.01); *C10B 53/02* (2013.01); *C10B 57/06* (2013.01);
(Continued)

(58) Field of Classification Search
CPC .................................. C10B 49/22; C10G 1/08
(Continued)

(56) References Cited

U.S. PATENT DOCUMENTS 3,639,228 A    2/1972  Carr et al.
4,426,359 A    1/1984  Woebeke et al.
(Continued)

FOREIGN PATENT DOCUMENTS

EP    0892031 A2    1/1999

OTHER PUBLICATIONS

PCT International Search Report and Written Opinion in corresponding PCT/USI6/053440 dated Jan. 9, 2017 (11 pages).

*Primary Examiner* — Philip Y Louie
(74) *Attorney, Agent, or Firm* — John Wilson Jones; Jones Delflache LLP

(57) ABSTRACT

Biomass is converted into a bio-oil containing stream in a riser reactor containing a cooling media. The cooling media quenches the rapid heat transfer to the biomass during cracking of the biomass in the mixing zone of the riser. By lowering the temperature to which the mixing zone effluent is exposed, production of carbon monoxide and light gases is decreased during thermolysis of the biomass.

30 Claims, 6 Drawing Sheets

(51) Int. Cl.
  *C10B 53/02* (2006.01)
  *C10B 57/06* (2006.01)
  *C10G 1/00* (2006.01)

(52) U.S. Cl.
  CPC ..... *C10G 1/002* (2013.01); *C10G 2300/1014* (2013.01); *C10G 2300/4006* (2013.01); *C10G 2300/4081* (2013.01); *C10G 2300/701* (2013.01)

(58) Field of Classification Search
  USPC .......................................................... 585/240
  See application file for complete search history.

(56) References Cited

U.S. PATENT DOCUMENTS

| | | | |
|---|---|---|---|
| 4,490,241 A | 12/1984 | Chou | |
| 4,820,493 A | 4/1989 | Haddad et al. | |
| 4,961,907 A | 10/1990 | Herbst et al. | |
| 5,071,539 A | 12/1991 | Hayward et al. | |
| 5,176,815 A | 1/1993 | Lomas | |
| 5,288,920 A | 2/1994 | Chan et al. | |
| 5,800,697 A | 9/1998 | Lengemann | |
| 8,003,835 B2 | 8/2011 | Yanik et al. | |
| 8,057,641 B2 | 11/2011 | Bartek et al. | |
| 8,063,258 B2 | 11/2011 | Bartek et al. | |
| 8,137,632 B2 | 3/2012 | Bartek et al. | |
| 8,226,818 B2 | 7/2012 | Sandacz | |
| 8,288,600 B2 | 10/2012 | Bartek et al. | |
| 8,323,477 B2 | 12/2012 | Couch et al. | |
| 8,519,203 B2 | 8/2013 | Marinangeli et al. | |
| 8,557,193 B2 | 10/2013 | Bartek et al. | |
| 8,747,657 B2 | 6/2014 | Davydov et al. | |
| 8,747,758 B2 | 6/2014 | Davydov et al. | |
| 8,747,759 B2 | 6/2014 | Wolschlag et al. | |
| 8,815,082 B2 | 8/2014 | Wolschlag et al. | |
| 8,888,991 B2 | 11/2014 | Etter | |
| 8,916,099 B2 | 12/2014 | Johnson et al. | |
| 8,932,371 B2 | 1/2015 | Bartek et al. | |
| 8,936,758 B2 | 1/2015 | Palmas et al. | |
| 9,017,428 B2 | 4/2015 | Brady et al. | |
| 9,044,727 B2 | 6/2015 | Kulprathipanja et al. | |
| 2005/0234281 A1 | 10/2005 | Bjorklund | |
| 2008/0152552 A1 | 6/2008 | Hedrick | |
| 2009/0227823 A1 | 9/2009 | Huber et al. | |
| 2010/0113849 A1* | 5/2010 | Bartek | C10G 1/08 585/240 |
| 2010/0162625 A1 | 7/2010 | Mills | |
| 2010/0209965 A1 | 8/2010 | O'Connor et al. | |
| 2011/0139683 A1 | 6/2011 | Sandacz | |
| 2011/0258912 A1 | 10/2011 | O'Connor et al. | |
| 2013/0148463 A1 | 6/2013 | Davydov et al. | |
| 2013/0148464 A1 | 6/2013 | Davydov et al. | |
| 2013/0148465 A1 | 6/2013 | Wolschlag et al. | |
| 2013/0150233 A1 | 6/2013 | Wolschlag et al. | |
| 2013/0205651 A1* | 8/2013 | Wang | C10B 49/22 44/307 |
| 2013/0232855 A1 | 9/2013 | Loezos et al. | |
| 2013/0250716 A1 | 9/2013 | Palmas et al. | |
| 2013/0250717 A1 | 9/2013 | Johnson et al. | |
| 2013/0252803 A1 | 9/2013 | Johnson et al. | |
| 2013/0252805 A1 | 9/2013 | Palmas et al. | |
| 2014/0121428 A1 | 5/2014 | Wang et al. | |
| 2015/0203763 A1 | 7/2015 | Brady et al. | |
| 2015/0247095 A1* | 9/2015 | Ramirez Corredores | C10G 1/08 585/240 |
| 2018/0223191 A1* | 8/2018 | Bauer | B01J 8/1809 |

* cited by examiner

USE OF COOLING MEDIA IN BIOMASS CONVERSION PROCESS

FIELD OF DISCLOSURE

The disclosure relates to a process of converting biomass into bio-oil using a cooling media downstream from the mixing zone in a riser reactor.

BACKGROUND OF THE DISCLOSURE

Renewable energy sources, such as biofuels, provide a substitute for fossil fuels and a means of reducing dependence on petroleum oil. In light of its low cost and wide availability, solid biomass is often used as a feedstock to produce bio-oil which, in turn, is used to produce biofuel.

Many different conversion processes have been developed for converting solid biomass to bio-oil in a biomass conversion unit. Existing biomass conversion processes include, for example, thermolysis, such as slow pyrolysis and fast pyrolysis, and catalytic thermolysis. Thermolysis is characterized by the thermal decomposition of materials in an oxygen-poor or oxygen-free atmosphere (i.e., significantly less oxygen than required for complete combustion). The liquid product resulting from thermolysis of biomass includes organic materials. In some instances, the liquid product may be separated into an aqueous phase and an organic phase. The organic phase is commonly referred to as bio-oil. Bio-oil may be processed into transportation fuels as well as into hydrocarbon chemicals and/or specialty chemicals.

In addition to liquid reaction products, pyrolysis produces gaseous reaction products and solid reaction products. Gaseous reaction products include carbon dioxide, carbon monoxide, and relatively minor amounts of hydrogen, methane, and ethylene. Solid reaction products include carbonaceous deposits, such as coke and char. Such solids reduce the yield of bio-oil and are largely removed after the converted biomass exits the biomass conversion unit.

In order to maximize the liquid yield, while minimizing the solid and non-condensable gaseous reaction products, thermolysis is conducted at a relatively fast heating rate of the biomass feedstock. For example, the biomass may be rapidly heated between 150 and 600° C. and the reaction time kept short, i.e. on the order of milli-seconds to seconds. Such fast thermolysis results in high yields of primary, non-equilibrium liquids and gases (including valuable chemicals, chemical intermediates, petrochemicals and fuels).

There is a significant incentive to increase the yield of organic liquid products obtained by pyrolysis. To do so, it is necessary to enhance the yield of volatile condensable oily products (e.g., organic liquids) and reduce the levels of coke, char, gases (such as carbon monoxide and carbon dioxide).

It should be understood that the above-described discussion is provided for illustrative purposes only and is not intended to limit the scope or subject matter of the appended claims or those of any related patent application or patent. Thus, none of the appended claims or claims of any related application or patent should be limited by the above discussion or construed to address, include or exclude each or any of the above-cited features or disadvantages.

SUMMARY OF THE DISCLOSURE

In an embodiment of the disclosure, a process of subjecting solid biomass to thermolysis in a riser reactor is provided wherein the temperature in the reactor is controlled by a downstream cooling media. In this embodiment, a first catalyst is introduced into a riser reactor. The riser reactor has a mixing zone and an upper zone above the mixing zone. When introduced into the riser reactor, the first catalyst has a temperature $T_1$. A solid biomass is then introduced into the mixing zone of the riser reactor downstream from the entry of the first catalyst. The solid biomass and the first catalyst are mixed in the mixing zone. At least a portion of the solid biomass is reacted in the mixing zone. A second catalyst is then introduced into the upper zone of the riser reactor. The temperature of the second catalyst, $T_2$, is less than $T_1$. The entire effluent from the mixing zone is subjected to fluidized catalytic thermolysis in the upper zone of the riser reactor. At least a portion of the catalyst is recovered from the riser reactor and at least a portion of the recovered catalyst is regenerated. A first portion of the regenerated catalyst is then fed to a catalyst cooling chamber and a second portion of the regenerated catalyst is fed to the reactor riser upstream from the mixing zone. The first portion of the regenerated catalyst is then cooled in the catalyst cooling chamber to temperature $T_2$. The cooled regenerated catalyst is then introduced into the upper zone of the riser reactor.

In another embodiment of the disclosure, a process of subjecting solid biomass to thermolysis in a riser reactor is provided. The riser reactor has a mixing zone and an upper zone above the mixing zone. In this embodiment, a first catalyst having a temperature $T_1$ is introduced into the riser reactor. Solid biomass is also introduced into the mixing zone downstream from the point of entry of the first catalyst. The solid biomass and the first catalyst are mixed and the solid biomass is subjected to pyrolysis in the mixing zone. The resulting product, the mixing zone effluent, is then subjected to thermocatalysis in the upper zone. The temperature in the upper zone of the riser reactor is reduced by introducing into the upper zone a second catalyst. The temperature, $T_2$, of the second catalyst is less than $T_1$. At least a portion of the first catalyst and the second catalyst are recovered from the riser reactor and at least a portion of the recovered catalyst is regenerated. A first portion of the regenerated catalyst is fed to a catalyst cooling chamber and a second portion of the regenerated catalyst is fed to the reactor riser upstream from the mixing zone. The first portion of the regenerated catalyst is cooled in the catalyst cooling chamber to temperature $T_2$. The cooled regenerated catalyst is then introduced into the upper zone.

In another embodiment, a process of subjecting solid biomass to thermolysis in a riser reactor using a first solid particulate and a second solid particulate is provided. In this embodiment, the riser reactor has a mixing zone and an upper zone. A first solid particulate heated to a temperature $T_1$ is introduced into the riser reactor. Solid biomass is also introduced into the mixing zone downstream from the entry of the first solid particulate. The solid biomass and the first solid particulate are mixed in the mixing zone and the mixture is then subjected to pyrolysis where at least a portion of the solid biomass is pyrolyzed. A second solid particulate is then introduced into the upper zone of the riser reactor. The second solid particulate having been heated to a temperature $T_2$, wherein $T_2$ is less than $T_1$. The second solid particulate is a catalyst. The treated mixture is then subjected to fluidized catalytic thermolysis in the upper zone. At least a portion of the first solid particulate and the second solid particulate is removed from the riser reactor and the first solid particulate and the second solid particulate are separated. At least a portion of the separated first solid particulate and the separated second solid particulate are regenerated. At least a portion of the regenerated first solid particulate is fed into the riser reactor upstream from the mixing zone, the regenerated first solid particulate heated to the temperature $T_1$. At least a portion of the regenerated second solid particulate is cooled to the temperature $T_2$. At least a portion of the cooled regenerated second solid particulate is then fed into the upper zone as a cooling media and to cool the effluent from the mixing zone.

In another embodiment, a process of subjecting solid biomass to thermolysis in a riser reactor is provided wherein the temperature in the reactor is controlled by a cooling media which may, optionally, include a vaporizable liquid. The riser reactor has a mixing zone and an upper zone above the mixing zone. A first solid particulate heated to a temperature of $T_1$ is introduced into the riser reactor. Solid biomass is also introduced into the mixing zone downstream from the entry point of the first solid particulate. The solid biomass and the first solid particulate are mixed in the mixing zone and the solid biomass reacted. The resulting effluent from the mixing zone is then introduced into the upper zone; the temperature in the upper zone cooled by the addition of a cooling media into the upper zone. The cooling media comprises a second solid particulate comprising a solid catalyst and, optionally, the vaporizable liquid; the cooling media having a temperature, $T_2$, wherein $T_2$ is less than $T_1$. The mixing zone effluent is subjected to fluidized catalytic thermolysis in the upper zone.

In another embodiment of the disclosure, a process for converting solid biomass to hydrocarbons in a riser reactor using a vaporizable material as cooling media is provided. In this embodiment, a first solid particulate heated to a temperature of $T_1$ is introduced into the riser reactor. The riser reactor has an upper zone above a mixing zone. The solid biomass is introduced into the mixing zone downstream from the point of entry of the first solid particulate. The solid biomass and the first solid particulate are agitated in the mixing zone and the agitated mixture is reacted. The resulting pyrolyzed product is introduced to the upper zone of the riser reactor and the cooling media is introduced into the upper zone. The cooling media comprises the vaporizable material, the vaporizable material having a temperature, $T_2$, wherein $T_2$ is less than $T_1$. The pyrolyzed product is subjected to fluidized catalytic thermolysis in the upper zone. A fluid stream is then separated from effluent from the riser reactor. An organic-enriched stream and an aqueous stream are separated from the fluid stream. The vaporizable material may be bio-naphtha separated from the organic-enriched stream and/or light hydrocarbons having a boiling point between from about 150° F. to about 180° F. originating from a topped bio-oil fraction from the organic-enriched stream.

In another embodiment of the disclosure, a process of subjecting solid biomass to thermolysis in a riser reactor is provided. The riser reactor has a mixing zone and an upper zone above the mixing zone. A first solid particulate, heated to a temperature of $T_1$, is introduced into the mixing zone of the riser reactor. The solid biomass is then introduced into the mixing zone downstream from the point of entry of the first solid particulate. The solid biomass and the first solid particulate are mixed in the mixing zone and the mixture treated such that at least a portion of the solid biomass is pyrolyzed. A vaporizable material having a temperature, $T_2$ (wherein $T_2$ is less than $T_1$), is introduced into the upper zone of the riser reactor as a cooling media and the treated mixture is subjected to fluidized catalytic thermolysis in the upper zone. The effluent from the catalytic thermolysis is removed from the riser reactor. The effluent is separated into a fluid phase and a solid phase. An organic-enriched phase is separated from the fluid phase and the organic-enriched phase is then separated into a bio-oil containing stream and a distillate stream. The vaporizable material is separated from the bio-oil containing stream or distillate stream. The separated vaporizable material is then introduced into the upper zone of the riser reactor as the cooling media.

Accordingly, the present disclosure includes features and advantages which are believed to enable it more efficiently produce bio-oil from solid biomass using a cooling media to control the temperature in the reactor. Characteristics and advantages of the present disclosure described above and additional features and benefits will be readily apparent to those skilled in the art upon consideration of the following detailed description of various embodiments and referring to the accompanying drawings.

BRIEF DESCRIPTION OF THE DRAWINGS

The following figures are part of the present specification, included to demonstrate certain aspects of various embodiments of this disclosure and referenced in the detailed description herein.

DETAILED DESCRIPTION OF THE PREFERRED EMBODIMENTS

Figure 1:
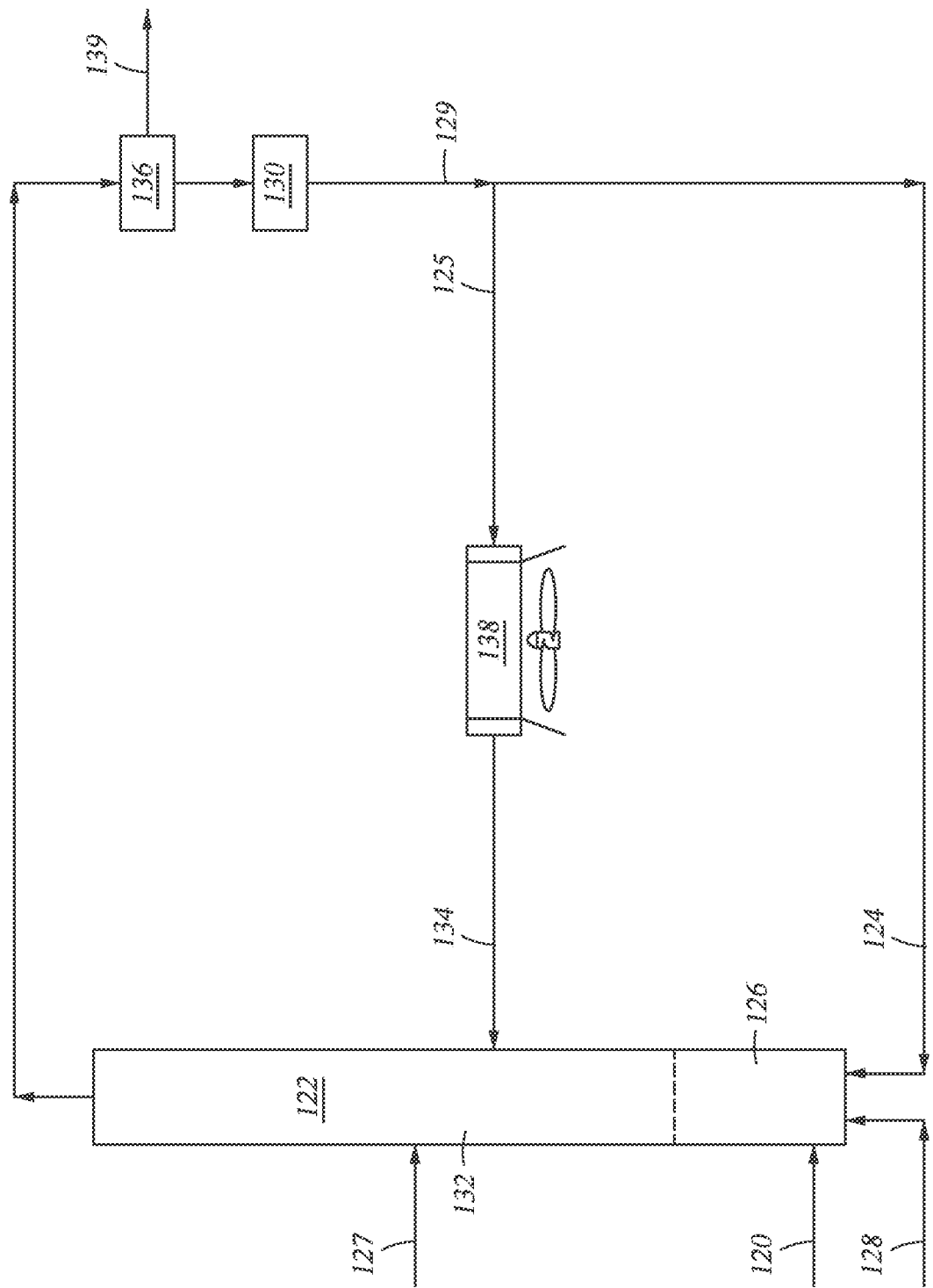
FIG. 1 is a flow diagram illustrating a process of converting a biomass into bio-oil by thermocatalysis using a cooling media comprising a catalyst.

Characteristics and advantages of the present disclosure and additional features and benefits will be readily apparent to those skilled in the art upon consideration of the following detailed description of exemplary embodiments of the present disclosure and referring to the accompanying figures. It should be understood that the description herein and appended drawings, being of example embodiments, are not intended to limit the claims of this patent or any patent or patent application claiming priority hereto. On the contrary, the intention is to cover all modifications, equivalents and alternatives falling within the spirit and scope of the claims. Many changes may be made to the particular embodiments and details disclosed herein without departing from such spirit and scope.

In showing and describing preferred embodiments in the appended figures, common or similar elements are referenced with like reference numerals or are apparent from the figures and/or the description herein. The figures are not necessarily to scale and certain features and certain views of the figures may be shown exaggerated in scale or in schematic in the interest of clarity and conciseness.

As used herein and throughout various portions (and headings) of this patent application, the terms "disclosure", "present disclosure" and variations thereof are not intended to mean every possible embodiment encompassed by this disclosure or any particular claim(s). Thus, the subject matter of each such reference should not be considered as necessary for, or part of, every embodiment hereof or of any particular claim(s) merely because of such reference.

Certain terms are used herein and in the appended claims to refer to particular components. As one skilled in the art will appreciate, different persons may refer to a component by different names. This document does not intend to distinguish between components that differ in name but not function. Also, the terms "including" and "comprising" are used herein and in the appended claims in an open-ended fashion, and thus should be interpreted to mean "including, but not limited to . . . ." Further, reference herein and in the appended claims to components and aspects in a singular tense does not necessarily limit the present disclosure or appended claims to only one such component or aspect, but should be interpreted generally to mean one or more, as may be suitable and desirable in each particular instance.

In the process disclosed, a solid biomass feedstock is first agitated in the mixing zone of a biomass conversion unit in the presence of a solid particulate. Since the process may employ multiple solid particulates, the solid particulate introduced into the mixing zone shall be referred to as the "first solid particulate".

The biomass conversion unit is preferably a riser reactor. In addition to the mixing zone, the riser reactor has an upper zone into which effluent from the mixing zone ("the mixing zone effluent") advances. One or more zones ("uppermost zones") in the riser reactor may be located downstream from the upper zone. The upper zone and uppermost zones are thermal zones and are not necessarily physically separate zones or separated zones.

The first solid particulate may be any suitable heat exchange material. Heat exchange materials may be inorganic, such as sand. Exemplary heat exchange materials may further include a biomass conversion catalyst (BCC).

Suitable biomass conversion catalysts include those known in the art, such as (i) a solid acid, such as a zeolite, super acid, clay, etc., (ii) a solid base, such as metal oxides, metal hydroxides, metal carbonates, basic clays, etc., (iii) a metal or a compound containing a metal functionality, such as Fe, Cu, Ni (like NiW or NiMo), transition metal sulfides such as sulfided NiMo, sulfided CoMo, etc., reduced metals, such as reduced Ni; noble metal catalysts, such as Ru, Pt, and Pd., transition metal carbides, etc., (iv) an amphoteric oxide, such as alumina, silica, titania, etc. and (v) a metal loaded onto a support such as alumina, silica, zirconia, carbon, etc. Catalysts with an acid functionality such as a silica-alumina, sulfated oxides, and support phosphoric acids are also exemplary BCCs.

The biomass may be in the form of solid particles of finely divided particles. The biomass may be introduced into the mixing zone of the reactor in a slurry. The biomass is rarely pre-heated prior to being introduced into the mixing zone.

In an embodiment, the biomass may include fibrous materials comprising cellulose. Examples of suitable cellulose-containing materials include algae, paper waste, and/or cotton linters. In one embodiment, the biomass comprises a lignocellulosic material. Examples of suitable lignocellulosic materials include forestry waste such as wood chips, saw dust, pulping waste, and tree branches; agricultural waste such as corn stover, wheat straw, and bagasse; and/or energy crops such as eucalyptus, switch grass, and coppice.

The first solid particulate is added to the riser reactor upstream from the point of entry of the biomass into the mixing zone. The first solid particulate acts as a heat source and enables the cracking of the biomass into smaller molecules. Bio-oil is produced from the cracking of the biomass. Agitation of the biomass and the first solid particulate in the mixing zone is very brief, typically no more than 20 seconds and, in many instances, less than 20 milliseconds.

In the mixing zone, the biomass and the first solid particulate are combined with an upwardly flowing gas from a lift gas source. The solid biomass and first solid particulates are entrained by the lift gas and rise upwardly into the upper zone of the reactor. The lift gas introduced into the mixing zone may be any of a variety of substantially oxygen-free gases including inert gases (such as nitrogen, steam or carbon dioxide), reducing gases (such as hydrogen or carbon monoxide, etc.

In the mixing zone, the biomass and the first solid particulate may be subjected to shearing action sufficient to mix the biomass and particulates to facilitate the conversion of the biomass into bio-oil. This may include turbulent gas flow within the reactor. For instances, in some cases, the design of the catalyst bed within the reactor may provide eddies and vortices for turbulent gas flow. Mechanical action may further provide the requisite shear for conversion of the biomass into bio-oil. Such mechanical action may be provided by kneading, milling, crushing, extruding, chopping, mixing or a combination thereof.

Typically, the temperature in the mixing zone in the riser reactor during agitation of the biomass and the first solid particulate is between from about 900° F. to about 1350° F. The temperature in the mixing zone may be controlled by adjusting the ratio of the first solid particulate to the solid biomass introduced into the mixing zone.

The temperature, $T_1$, of the first solid particulate introduced into the mixing zone is typically from about 1100° F. to about 1400° F. The temperature in the mixing zone at the time of introduction of the solid biomass into the mixing zone is between from about 950° F. to about 1400° F.

The mixing zone effluent (which includes the bio-oil converted from the biomass) ascends into the upper zone of the riser reactor. The mixing zone effluent contains solids, bio-oil, gases as well as minerals. While coke and char may be left as residue in the mixing zone, the mixing zone effluent advancing into the upper zone of the riser reactor contains most of the coke and char produced during conversion of the biomass. In addition, while minerals may remain in the inventory of the first solid particulate in the mixing zone, they may also be contained in the mixing zone effluent.

The mixing zone effluent is subjected to thermolysis in the upper zone of the riser reactor. A cooling media is introduced into the upper zone of the riser reactor. The cooling media contacts the mixing fluid effluent as it ascends into the upper zone of the riser. The cooling media most desirably does not condense in the reactor riser during thermolysis.

The temperature of the cooling media, $T_2$, is lower than $T_1$. While $T_2$ may be as low as ambient, $T_2$ more typically from about 500° F. to about 1100° F. In an embodiment, the difference between $T_2$ of the cooling media entering the upper zone of the riser reactor and $T_1$ of the first solid particulate is between from about 50° F. to about 500° F.

The temperature of the mixing zone effluent is reduced by the cooling media. Thus, thermolysis in the upper zone of the riser reactor proceeds at a lower temperature than the mixing zone effluent. Typically, a high rate of heat transfer to the biomass occurs during reaction of the solid biomass and the first solid particulate in the mixing zone of the riser reactor. Without the use of the cooling media disclosed herein excessive overcracking of the biomass occurs in the riser reactor as the outlet temperature from the reactor is near the inlet temperature of the solid particulate in the mixing zone. The addition of the cooling media in the upper zone reduces the production of carbon monoxide and light gases during thermolysis. This, in turn, reduces the efficiency of deoxygenation downstream from the riser reactor. Thus, the cooling media decreases the temperature in the riser reactor in a controlled manner that suppresses the thermal reactions relative to the catalytic reactions.

The cooling media may be a solid particulate or a vaporizable material. Where a solid particulate is introduced into the upper zone of the riser reactor, it shall be referred to herein as the "second solid particulate".

Catalytic thermolysis may be conducted in the upper zone by use of a catalyst as the cooling media. Exemplary catalysts for use as cooling media include any of the biomass conversion catalysts set forth in the paragraphs above.

Where the first solid particulate and the second solid particulate are both catalysts, the catalyst introduced into the mixing zone and the upper zone, respectively, may be the same catalyst or different catalysts.

Where the first solid particulate and the second solid particulate are different materials, they preferably are separable from each other in order that they may be regenerated as separate streams in different regenerators. Alternatively, the first and second solid particulates may be first regenerated in a single regenerator and the regenerated products separated downstream from the regenerator, yet upstream from the cooling media.

The first solid particulate and second solid particulate may differ from each other by a physical property, such as particle size, density, etc.

Typically, the weight ratio of first solid particulate to second solid particulate introduced into the mixing zone and the upper zone of the riser reactor, respectively, is between from about 85:15 to about 15:85.

The riser reactor may have more than one zone downstream from the mixing zone. For instance, the riser reactor may have an uppermost zone downstream from the upper zone. A heat exchange material, defined herein, may be fed into the uppermost zone to enhance thermolysis efficiency. The heat exchange material ("the third solid particulate") may also serve as a cooling media. The heat exchange material introduced into the uppermost zone may differ from the second solid particulate and/or first solid particulate.

Where a solid particulate is used in the uppermost zone, the weight ratio of the first solid particulate to the third solid particulate is preferably between from about 85:15 to about 15:85.

The temperature of the third solid particulate, $T_3$, introduced into the uppermost zone of the reactor is different from $T_1$ and $T_2$ and typically is less than $T_2$.

The riser effluent may include solids and fluid (e.g. gas and vapors) as well as spent and/or used solid particulate(s). Typically, the amount of coke and char produced in the riser during thermolysis is between from about 9 to about 25% by weight based on the weight of the solid biomass. The majority of the coke and char exits the riser reactor as part of the riser effluent.

The solids and gases in the riser effluent are separated in a gas solid separator. Suitable separators may include any conventional device capable of separating solids from gas and vapors such as, for example, a cyclone separator, gas filter, coalescer, gravity phase separator, etc. Typically, from about 95 to essentially 100% percent of the solids are removed from the mixture in the separator. Optionally and preferably, remaining solids in the mixture may further be removed, such as by polishing filtration.

The separated gas stream containing volatile components may be processed downstream. In addition to the removal of heavy materials and solids, water may be removed during the separation.

The separated solids may then be sent into a regeneration unit. In the regeneration unit, char and coke are combusted and activity is restored to at least some of the first solid particulates and/or the second solid particulates and/or (where applicable) the third solid particulates.

Where the first solid particulates and second solid particulates (and optional third solid particulates) do not differ from each other then the solid particulates may be regenerated in a single regeneration unit. A portion of the regenerated solid particulates may then be fed into the mixing zone upstream from the point of entry of the biomass into the mixing zone. A portion of the regenerated solid particulates may be fed into the cooling chamber and cooled to a temperature, $T_2$, and then introduced into the upper zone as cooling media. Where the riser reactor has an uppermost zone, a portion of the regenerated solid particulates may be fed into the uppermost zone.

Where the first solid particulates, second solid particulates and/or third solid particulates are distinct and separable from each other, streams containing the first solid particulates, second solid particulates and/or third solid particulates may be introduced into a solids separator capable of separating the streams.

Once separated, each of the streams may be alternatively introduced into separate regeneration units where char and coke are combusted and activity is restored to each of the particulates. The separated first solid particulates may then be introduced into the reactor riser upstream from the mixing zone, the separated second solid particulates, after being cooled to a temperature of $T_2$, may be introduced into the upper zone of the riser reactor as cooling media and, where applicable, the separated third solid particulates may be introduced into the uppermost zone of the riser reactor.

As an alternative, in those instance where the first solid particulates, second solid particulates and/or third solid particulates are distinct and separable from each other, the stream containing the first solid particulates, second solid particulates and/or third solid particulates may be introduced into a regenerator where char and coke are combusted and activity is restored to the particulates. The particulates may then be separated in a solids separator upstream from the cooling media. The separated first solid particulates may then be introduced into the riser reactor upstream from the mixing zone, the second solid particulates, after being cooled to a temperature of $T_2$, may be introduced into the upper zone of the reactor as cooling media and, where applicable, the separated third solid particulates may be introduced into the uppermost zone of the riser reactor.

Instead of the cooling media being a solid particulate, the cooling media may comprise a vaporizable material. The vaporizable material, cooled to a temperature of $T_2$, may originate downstream. In an embodiment, for instance, the vaporizable material may constitute a distillate from fractionation. In another embodiment, the vaporizable material may constitute a distillate from a hydrotreatment process. Vaporizable materials may include, for example, ethanol, methanol, butanol, a glycol or a combination thereof.

The processes referred to herein may be continuous.

Various alternative embodiments of the process are set forth in the Figures. It should be understood that all of the apparatus and processes mentioned below may have any suitable number and type of components, configuration and operation, as is and may become further known. Further, all embodiments of the present disclosure are neither limited to, nor require, each component, process and the particular details mentioned below.

Referring to FIG. 1, in accordance with an embodiment of the present disclosure, a method of producing renewable fuels from biomass material is provided wherein the first solid particulates and the second solid particulates are the same and are catalysts. As depicted, a solid biomass feedstream 120 is fed from one or more external sources into a biomass conversion unit, shown as riser reactor 122. The biomass is heated and mixed with first catalyst 124 in mixing zone 126. The temperature in the mixing zone during mixing is between from about 900° F. to about 1350° F. As shown, first catalyst 124 and lift gas 128 are added upstream from the point of entry of biomass 120 into riser reactor 122. First catalyst 124 acts as a heat source enabling the cracking of the biomass in mixing zone 126. The residence time of mixing solid biomass 120 and first catalyst 124 in mixing zone 126 is very brief, typically no more than 20 seconds, and in some cases less than 20 milli-seconds.

FIG. 1 shows first catalyst 124 being fed into riser reactor 122 as regenerated catalyst from regenerator 130. The temperature, $T_1$, of first catalyst 124 introduced into mixing zone 126 is typically from about 1100° F. to about 1400° F.

The mixing zone effluent containing bio-oil ascends into upper zone 132 of riser reactor 122. The mixing zone effluent is subjected to catalytic thermolysis in upper zone 132. The second catalyst 134 (the cooling media) of temperature $T_2$ (where $T_2$ is lower than $T_1$) is introduced into upper zone 132. The temperature of the mixing zone effluent is reduced by second catalyst 134 such that catalytic thermolysis occurs in upper zone 132 at a cooler temperature than the reaction in mixing zone 126.

After exiting riser reactor 122, the riser effluent is introduced into solids separator 136. In solids separator 136, solids and fluids 139 in the riser effluent are separated. The solids which include char, coke and spent and/or used catalyst, are introduced into regenerator 130. In regenerator 130, char and coke are combusted and catalytic activity is restored to at least some of the catalyst.

After regeneration, at least a portion of the hot regenerated catalyst 129 may be fed back into mixing zone 126 of riser reactor 122 as stream 124. A portion of hot regenerated catalyst 129 from regenerator 130 may be fed into cooling chamber 138 (shown as stream 125) and cooled to $T_2$. The resulting cooled catalyst 134 then enters into the upper zone 132 of riser reactor 122.

Figure 2:
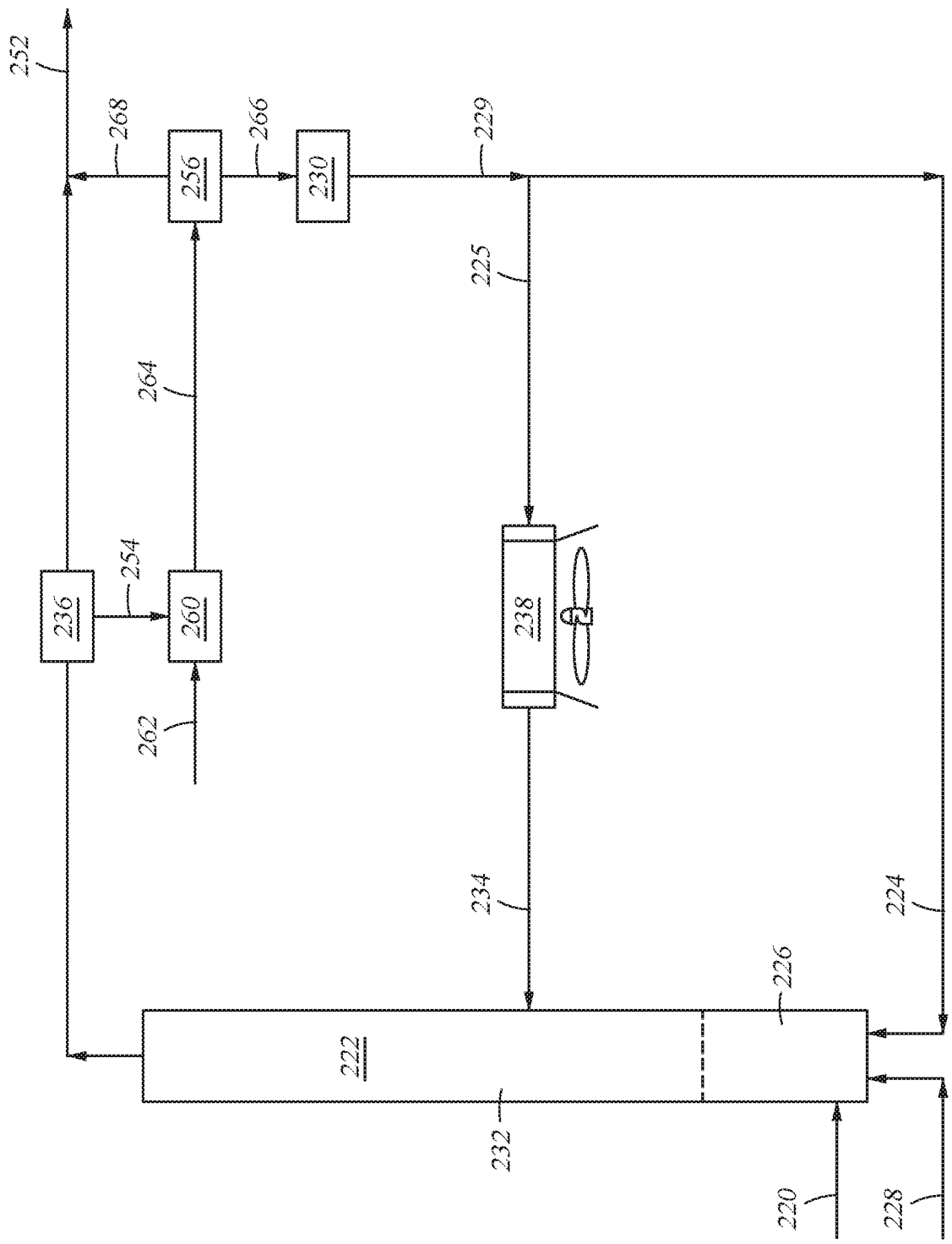
FIG. 2 is a flow diagram illustrating an alternative process of converting a biomass into bio-oil using a cooling media comprising regenerated catalyst.

FIG. 2 illustrates a modification of the process depicted in FIG. 1 wherein solid catalyst 224 and lift gas 228 are introduced into mixing zone 226 upstream from entry of biomass feed 220. In FIG. 2, the riser effluent stream from riser reactor 222 is introduced into solid/gas separator 236 to produce gas stream 252 and fluid stream 254. Separated gas stream 252 containing volatile components may be further processed downstream.

Separated fluid stream 254 is then treated in stripper 260 with stripping media 262. Suitable stripping media include steam, natural gas, nitrogen as well as other inert gases. In a preferred embodiment, the stripping media is steam.

Stripped stream 264 containing catalyst, volatiles and, predominately, hard coke is then fed into second separator 256. The volatiles in stream 264 are removed as stream 268 in second separator 256 and may be processed downstream with stream 252. Solid stream 266 from second separator 256 contains hard coke, characterized by low hydrogen content, and spent catalyst. The residual coke is removed from the spent catalyst in regenerator 230, principally by combustion.

Regenerated catalyst 229 may be fed back into mixing zone 226 as stream 224 or into catalyst cooling chamber 238 as stream 225 and cooled to $T_2$. Cooled regenerated catalyst 234 may then be fed into upper zone 232.

Figure 3:
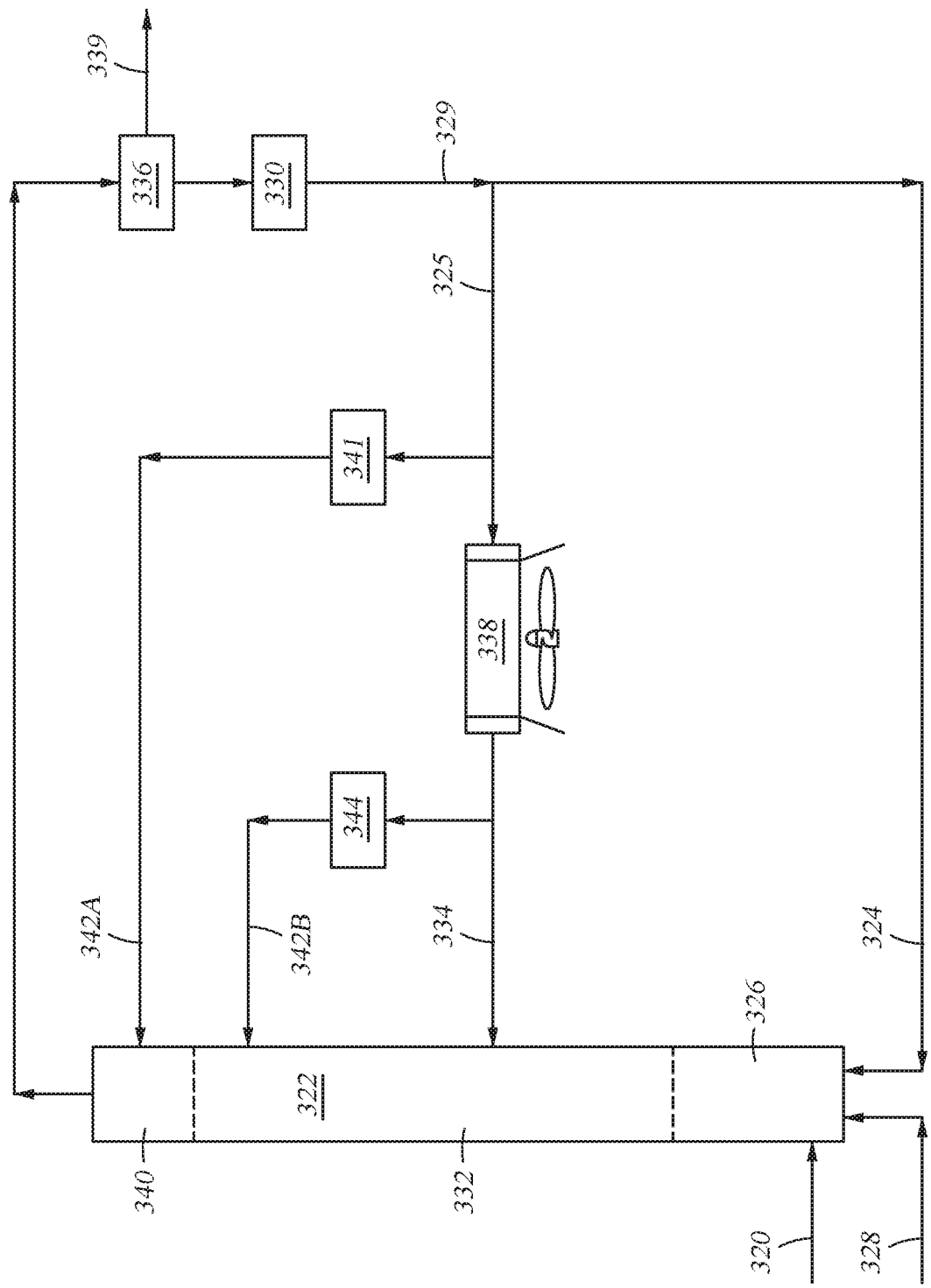
FIG. 3 is a flow diagram illustrating a process of converting a biomass into bio-oil by use of a cooling media and dissimilar solid particulates.

The riser reactor used in the conversion of biomass may consist of more than two zones. Depicted in FIG. 3 is riser reactor 322 having mixing zone 326, upper zone 332 and uppermost zone 340. The temperature in uppermost zone 340 is less than the temperature in upper zone 332. As in FIG. 1, solid biomass 320 is fed from one or more external sources into mixing zone 326 of riser reactor 322 and is heated and mixed with first catalyst 324 and lift gas 328. First catalyst 324 and lift gas 328 are added to mixing zone 326 upstream from the point of entry of the biomass into the mixing zone. First catalyst 324 is fed into mixing zone 326 as regenerated catalyst stream 324 from regenerator 330.

The mixing zone effluent is subjected to catalytic thermolysis in upper zone 332. A portion of hot regenerated catalyst 329 from regenerator 330 is fed as stream 325 into cooling chamber 338. The second catalyst 334 (the cooling media) of temperature, $T_2$, cooled in cooling chamber 338, is introduced into upper zone 332, wherein $T_2$ is lower than $T_1$.

As illustrated in FIG. 3, a third catalyst 342 may be introduced into uppermost zone 340 and catalytic thermolysis is then advanced from upper zone 332 to uppermost zone 340. In this depiction, the first catalyst 324, second catalyst 334 and third catalyst 342 are the same. The riser effluent may be treated as discussed in the processes depicted in FIG. 1 and FIG. 2 and the catalyst separated from gaseous fluid 339 in separator 336 may then be regenerated in regenerator 330. The temperature of the third catalyst, $T_3$, introduced into uppermost zone 340 is lower than $T_2$ which, in turn, is lower than $T_1$.

FIG. 3 illustrates two exemplary embodiments for the cooling of third catalyst 342 prior to introducing the third catalyst into uppermost zone 340. In one embodiment, a portion of regenerated catalyst of stream 325 may be diverted into catalyst cooling chamber 341 and the cooled catalyst 342A then introduced into uppermost zone 340. In another embodiment, a portion of regenerated catalyst stream 325 may be diverted into catalyst cooling chamber 338. In catalyst cooling chamber 338, the regenerated catalyst is cooled to the temperature $T_2$ for introducing second catalyst 334 into upper zone 332. A portion of the second catalyst from catalyst cooling chamber 338 may be further diverted to a second catalyst cooling chamber 344 to render the third catalyst 342B having a temperature of $T_3$. Either or both of these alternative embodiments may be used to render the third catalyst of temperature $T_3$.

Figure 4:
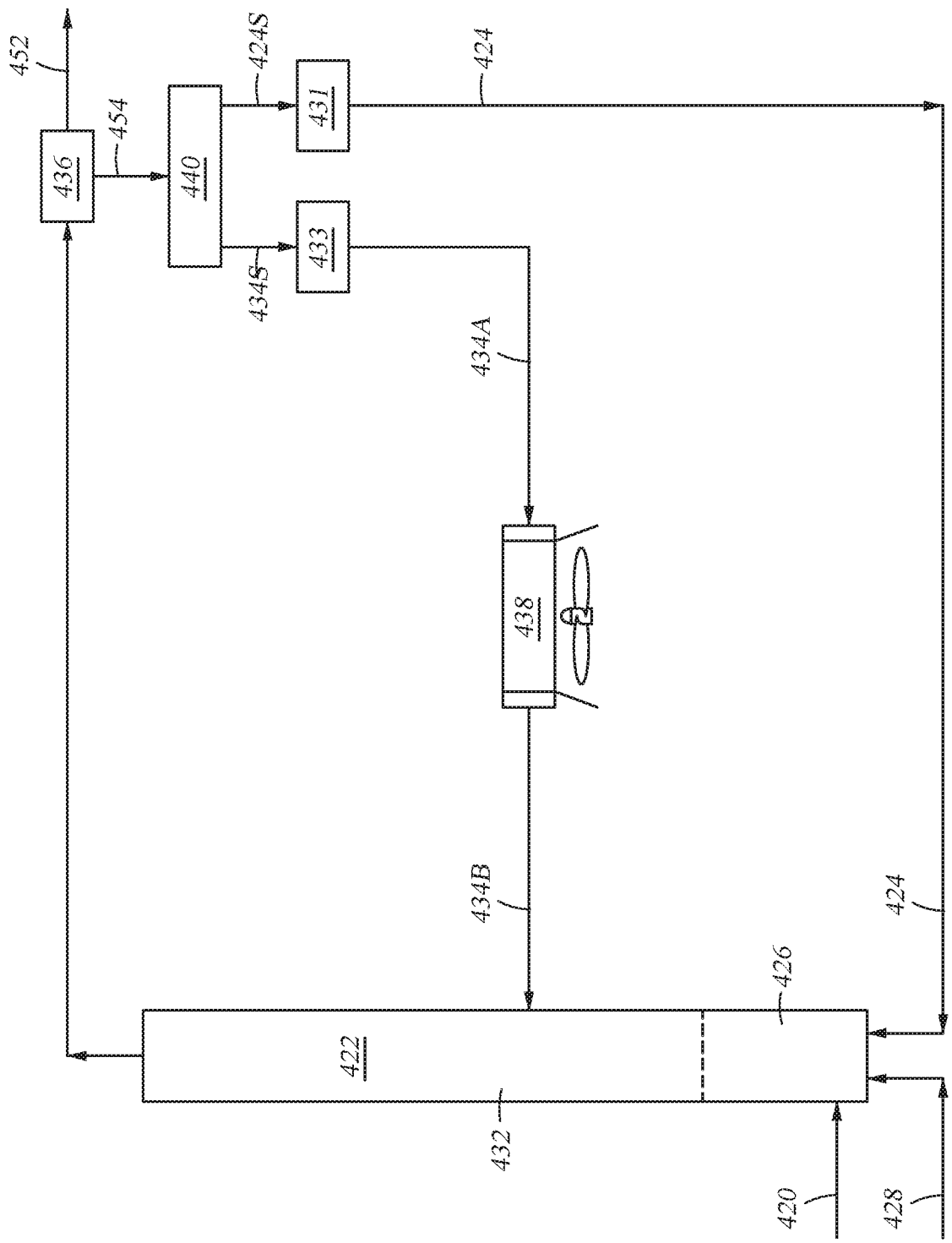
FIG. 4 is a flow diagram illustrating a process of converting a biomass into bio-oil by use of a cooling media and regenerated dissimilar solid particulates.

FIG. 4 illustrates another embodiment of the disclosure, where two different catalysts are used in the conversion of biomass and wherein both catalysts are regenerated during the conversion process. The two catalysts may differ in particle size, density or by other properties which permit the two catalysts to be separated. It will be understood that FIG. 4 may be modified to include more than two regenerators where the process involves one or more zones downstream from the upper zone.

Referring now to FIG. 4, solid biomass 420 and lift gas 428 are fed into mixing zone 426 of riser reactor 422.

First solid particulates 424 (which may be a biomass conversion catalyst) having a temperature of $T_1$, are provided to riser reactor 422 and are heated and mixed with the biomass feedstream in mixing zone 426. As shown, first solid particulates 424 are added upstream from the point of entry of biomass 420 into riser reactor 422. First solid particulates 424 may be fed into riser reactor 422 as regenerated particulates from regenerator 431.

The mixing zone effluent ascends into upper zone 432 of riser reactor 422. The mixing zone effluent is subjected to catalytic thermolysis in upper zone 432. Second solid particulates 434 (which may also be a biomass conversion catalyst) having temperature, $T_2$, are introduced into upper zone 432, wherein $T_2$ is lower than $T_1$. A portion of second solid particulates 434 may be regenerated solid particulates from regenerator 433.

First solid particulates 424 and second solid particulates 434B introduced into mixing zone 426 and upper zone 432, respectively, are different solid particulates and may differ by a physical property, such as particle size, density, etc.

Referring still to the embodiment of FIG. 4, the riser effluent ascends and exits riser reactor 422 through a top port. The riser effluent may include solids and fluid (e.g. gas and vapors) as well as spent first solid particulates and spent second solid particulates. After exiting riser reactor 422, the riser effluent is introduced into solid/gas separator 436 to render gas stream 452 and fluid stream 454. Separated gas stream 452 containing volatile components may be further processed downstream.

Spent first solid particulates 424S (spent particulates of solid particulates 424) and spent second solid particulates 434S in fluid stream 454 are separated from each other in solids separator 440. Solids separator 440 may be a conventional separator known in the art, such as a gravitational separator or magnetic separator, provided it is capable of separating solid particulates of different density, particle size, etc.

First solid particulates 424 are regenerated from spent first solid particulates catalyst 424S in first regenerator 431 where char and coke are combusted and activity is restored to them. Second solid particulates 434B are regenerated from spent second solid particulates 434S in second regenerator 433, where char and coke are combusted and activity is restored.

After regeneration, hot regenerated first solid particulates 424 may be fed back into mixing zone 426 of riser reactor 422. A portion of the second solid particulates 434A regenerated in regenerator 433 may further be fed into catalyst cooling chamber 438 and cooled to $T_2$. The resulting cooled regenerated catalyst 434B is then fed into upper zone 432 of riser reactor 422.

Figure 6:
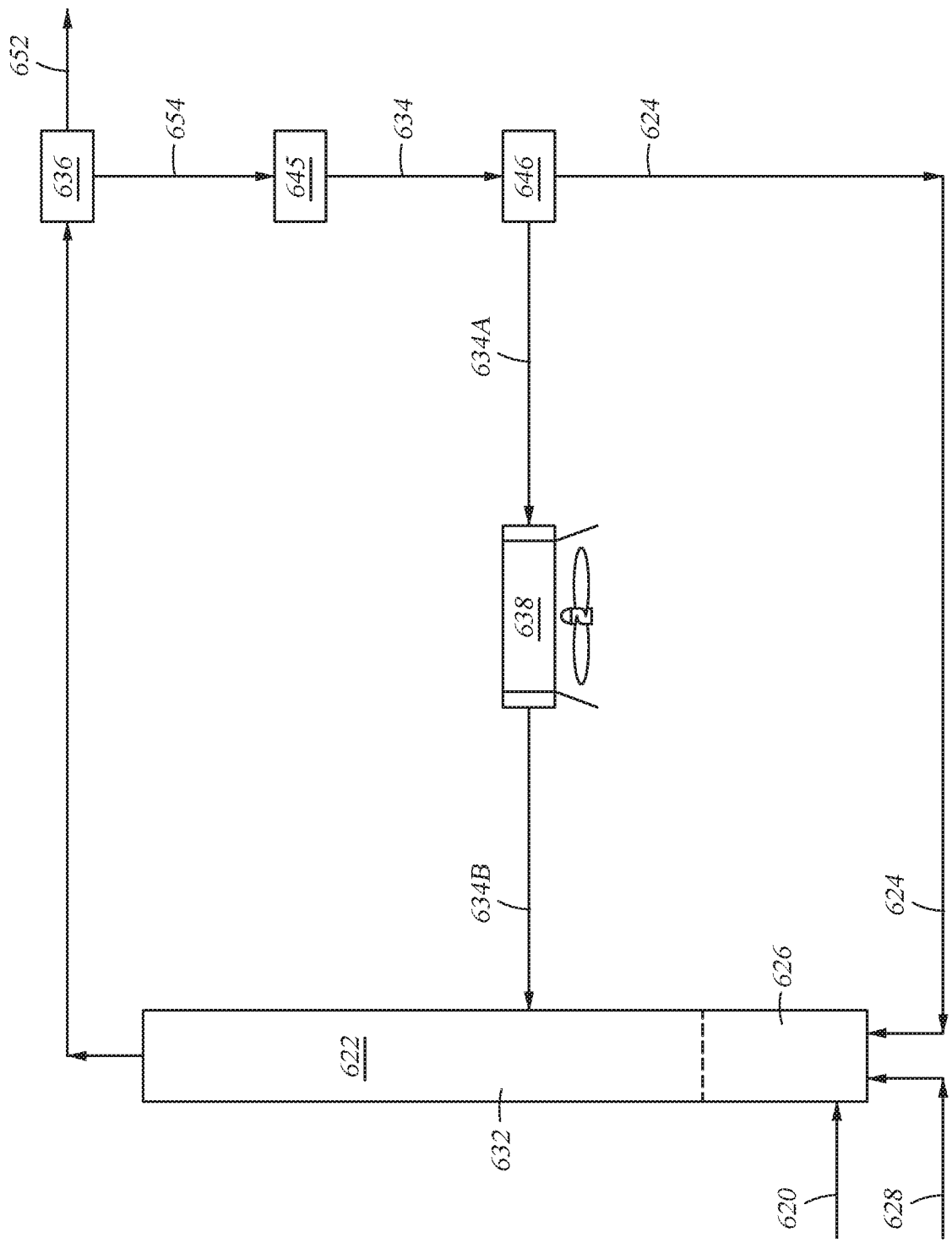
FIG. 6 is a flow diagram illustrating an alternative process of converting a biomass into bio-oil by use of a cooling media and regenerated dissimilar solid particulates.

FIG. 6 illustrates another embodiment where two different catalysts are used in the conversion of biomass and wherein both catalysts are regenerated during the conversion process. The two catalysts may differ in particle size, density or by other properties which permit the two catalysts to be separated. Referring to FIG. 6, solid biomass 620 is fed into mixing zone 626 of riser reactor 622.

First solid particulates 624 (which may be a biomass conversion catalyst) having a temperature of $T_1$, are provided to riser reactor 622 and are heated and mixed with the biomass feedstream in mixing zone 626. As shown, first solid particulates 624 as well as lift gas 628 are added upstream from the point of entry of biomass 620 into riser reactor 622. First solid particulates 624 may be fed into riser reactor 622 as regenerated particulates from solid separator 646.

The mixing zone effluent ascends into upper zone 632 of riser reactor 622. The mixing zone effluent is subjected to catalytic thermolysis in upper zone 632. Second solid particulates 634B (which may also be a biomass conversion catalyst) having temperature, $T_2$, are introduced into upper zone 632, wherein $T_2$ is lower than $T_1$. A portion of second solid particulates 634B may be regenerated solid particulates separated in separator 646.

First solid particulates 624 and second solid particulates 634B introduced into mixing zone 626 and upper zone 632, respectively, are different solid particulates and may differ by a physical property, such as particle size, density, etc.

Referring still to the embodiment of FIG. 6, the riser effluent ascends and exits riser reactor 622 through a top port. The riser effluent may include solids and fluid (e.g. gas and vapors) as well as spent first solid particulates and spent second solid particulates. After exiting riser reactor 622, the riser effluent is introduced into solid/gas separator 636 to render gas stream 652 and fluid stream 654. Separated gas stream 652 containing volatile components may be further processed downstream.

Fluid stream 654 is then introduced into regenerator 645 where char and coke are combusted and where spent first solid particulates and spent second solid particulates are regenerated and their activity restored. The regenerated solid particulates 634 are then fed from regenerator 645 into separator 646 where regenerated first solid particulates 624 and regenerated second solid particulates 634A are separated. Solids separator 646 may be a conventional separator known in the art, such as a gravitational separator, provided it is capable of separating solid particulates of different density, particle size, etc.

Hot regenerated first solid particulates 624 may be fed back into mixing zone 626 of riser reactor 622. At least a portion of the regenerated second solid particulates 634A separated in separator 646 may further be fed into catalyst cooling chamber 638 and cooled to $T_2$. The resulting cooled regenerated catalyst 634B is then fed into upper zone 632 of riser reactor 622.

Figure 5:
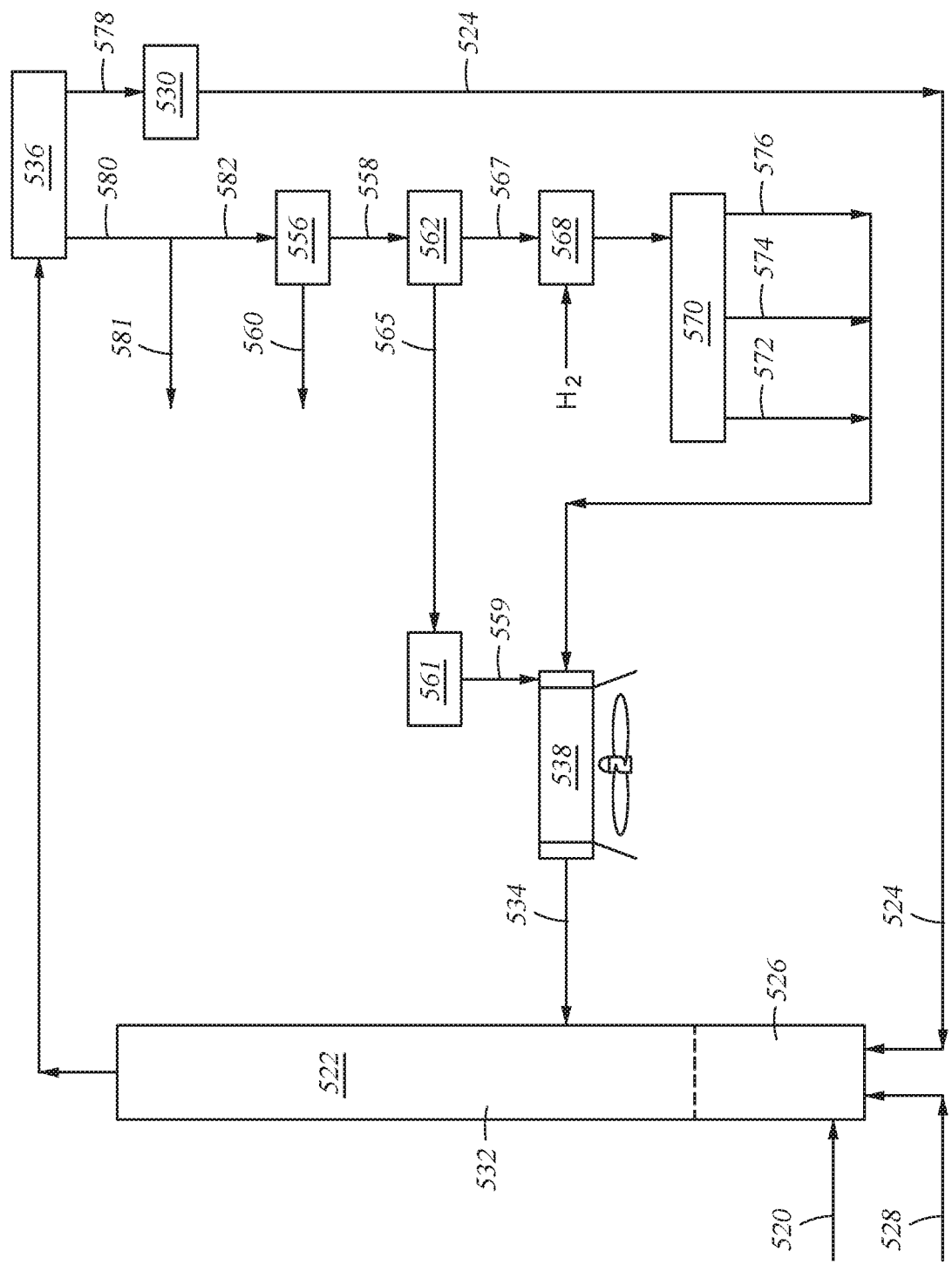
FIG. 5 is a flow diagram illustrating a process of converting a biomass into bio-oil by use of a cooling media comprising vaporizable material.

FIG. 5 illustrates another embodiment of the disclosure where the cooling media entering into the upper zone of the riser reactor is a vaporizable material. As illustrated, solid biomass feedstock 520 is fed into mixing zone 526 of reactor riser 522. First solid particulates (which may be a catalyst) 524 and lift gas 528 are fed into mixing zone 526. Mixing zone 526 is downstream from the point of entry of first solid particulates 524. First solid particulates 524 may be fed into riser reactor 522 as regenerated particulates from regenerator 530. The biomass and first solid particulates are agitated in mixing zone 526.

The mixing zone effluent then enters into upper zone 532 where it is cooled by cooling media 534 having a temperature of $T_2$. The cooling media is a vaporizable material treated in cooling chamber 538. Fluid stream 578 containing combustible solids and gaseous stream 580 in the riser effluent are separated in solid gas separation unit 536.

Fluid stream 578 containing spent first solid particulates may then be fed into regeneration unit 530 where the stream undergoes combustion and first solid particulates are regenerated. Regenerated first solid particulates 524 may then be fed back into mixing zone 526 of riser reactor 522 through a port upstream from the entry port of the biomass.

Gaseous stream 580 may then be cooled and quenched to provide gaseous stream 581 and liquid stream 582. Liquid stream 582 may then be fed into separator 556 to render organic-enriched stream 558 and aqueous stream 560. The organic-enriched stream 558 and aqueous stream 560 in separator 556. The organic-enriched phase 558 may further be separated in fractionator 562 into a full range bio-naphtha ("Bio-FRN") 565 containing light oxygenates of $C_5$ or less, a heavier bio-oil, or topped bio-oil fraction 567 containing $C_6$ or greater oxygenates and water (not shown). Bio-FRN 565 may be further separated in separator 561 and the bio-naphtha distillate 559 passed into cooling chamber 538.

Topped bio-oil stream 567 may be fed into hydrotreater 568. In the hydrotreater, the bio-oil containing stream is subjected to deoxygenation and desulfurization by the introduction of hydrogen.

Following deoxygenation in the hydrotreater, the deoxygenated stream may then be introduced into fractionator 570 to render renewable bio-oil (RBO). In fractionator 570, at least a portion of the material may be separated into light fraction stream 572, intermediate fraction stream 574 and heavy fraction stream 576 for use in renewable bio-fuels. The light fraction stream may have a boiling range below petroleum-derived gasoline and the intermediate fraction may have a boiling range comparable to petroleum-derived gasoline. The heavy fraction stream may have a boiling range comparable to diesel fuel. For instance, in an embodiment, the light fraction stream may have a boiling point between from about 150° F. to about 180° F., the intermediate fraction may have a boiling point between from about 180° F. to about 420° F. and the heavy fraction may have a boiling point above 420° F. Light fraction stream 572, intermediate fraction stream 574 and/or heavy fraction stream 576 may then be introduced as vaporizable material into catalyst cooling chamber 538. Preferably, all or a portion of heavy fraction stream 576 is fed into cooling chamber 538.

While not shown in FIGS. 3, 4, 5, and 6, it is understood that effluent from the riser may be separated into a gas stream and a fluid stream and the separated gas stream may then be treated in a stripper with a stripping media (as illustrated in FIG. 2).

Preferred embodiments of the present disclosure thus offer advantages over the prior art and are well adapted to carry out one or more of the objects of this disclosure. However, the present disclosure does not require each of the components and acts described above and are in no way limited to the above-described embodiments or process of operation. Any one or more of the above components, features and processes may be employed in any suitable configuration without inclusion of other such components, features and processes. Moreover, the present disclosure includes additional features, capabilities, functions, processes, uses and applications that have not been specifically addressed herein but are, or will become, apparent from the description herein, the appended drawings and claims.

EXAMPLES

The Examples herein are provided to illustrate different aspects of the disclosure. In the baseline case, hot catalyst and nitrogen were introduced to the bottom of a reactor riser, at a temperature of $T_1$. The biomass was then added and mixed with the hot catalyst, yielding a temperature of $T_h$. In the examples herein, cooler catalyst of temperature $T_2$ was then added further downstream, yielding a lower temperature of $T_c$.

For these examples the biomass contained 35 pounds of water for every 500 pounds of biomass on a dry basis. Nitrogen was added at 250 lb/hr while biomass was introduced at 500 lb/hr on a dry basis. The biomass and the nitrogen were introduced at 70° F. The temperature of the regenerated catalyst was 1325° F. In these examples the portion of circulating catalyst introduced above the feed point was cooled to 800° F. The following physical properties are assumed for these examples:

Biomass and pyrolysis products have a heat capacity of 0.406 BTU/lb ° F.
The heat of reaction for pyrolysis of the biomass is −85.5 BTU/lb
The nitrogen has a heat capacity of 0.263 BTU/lb ° F.
The catalyst has a heat capacity of 0.265 BTU/lb ° F.
The moisture in the biomass has a heat capacity of 0.454 BTU/lb ° F.
The heat of vaporization for the initial moisture in biomass is 970 BTU/lb
Base.

Hot catalyst was circulated at 4000 lb/hr and all of the catalyst was introduced into the riser reactor, below the biomass feed point.

Example 1

In Example 1, the total catalyst circulation rate remained at 4000 lb/hr, but 1000 lb/hr of the catalyst flow was passed through a heat exchanger that reduced the temperature of the catalyst from 1325° F. to 800° F. This cooler catalyst was introduced to the riser at a point downstream from the biomass feed.

Example 2

In Example 2, the total catalyst circulation rate was increased to 6000 lb/hr. Of this amount, 4000 lb/hr was introduced to the bottom of the riser (upstream from the biomass feed). The remaining 2000 lb/hr was cooled from 1325° F. to 800° F. and introduced at a point downstream from the biomass feed.

Example 3

In Example 3, the total catalyst circulation rate was 4000 lb/hr. Half of the catalyst was introduced to the bottom of the riser at 1325° F. while the other half was cooled to 800° F. and then introduced to the riser at a point downstream from the biomass feed.

The temperatures in the three zones ($T_1$, $T_h$ and $T_c$) for each case are shown in Table I below.

TABLE I

| Ex. | $T_1$ (° F.) | $T_h$ (° F.) | $T_c$ (° F.) |
| --- | --- | --- | --- |
| Base | 1252 | 1066 | 1066 |
| Example 1 | 1229 | 1002 | 963 |
| Example 2 | 1252 | 1066 | 991 |
| Example 3 | 1187 | 897 | 859 |

The process that may be described above or claimed herein and any other process which may fall within the scope of the appended claims can be performed in any desired suitable order and are not necessarily limited to any sequence described herein or as may be listed in the appended claims. Further, the process of the present disclosure does not necessarily require use of the particular embodiments shown and described herein, but are equally applicable with any other suitable structure, form and configuration of components.

The biomass to be pyrolyzed is generally ground to a small particle size in order to optimize pyrolysis. The biomass may be ground in a grinder or a mill until the desired particle size is achieved.

While exemplary embodiments of the disclosure have been shown and described, many variations, modifications and/or changes of the system, apparatus and process of the present disclosure, such as in the components, details of construction and operation, arrangement of parts and/or process of use, are possible, contemplated by the patent applicant(s), within the scope of the appended claims, and may be made and used by one of ordinary skill in the art without departing from the spirit or teachings of the disclosure and scope of appended claims. Thus, all matter herein set forth or shown in the accompanying drawings should be interpreted as illustrative, and the scope of the disclosure and the appended claims should not be limited to the embodiments described and shown herein.

What is claimed is:

1. A process of subjecting solid biomass to thermolysis in a riser reactor having a mixing zone and an upper zone above the mixing zone, the process comprising:
    (a) introducing a first catalyst into the mixing zone of the riser reactor, wherein the first catalyst has a temperature $T_1$;
    (b) introducing solid biomass into the mixing zone downstream from the first catalyst;
    (c) mixing the solid biomass and the first catalyst in the mixing zone and reacting at least a portion of the solid biomass to render a mixing zone effluent;
    (d) introducing into the upper zone a second catalyst, wherein the temperature, $T_2$ of the second catalyst is less than $T_1$;
    (e) subjecting the mixing zone effluent from the mixing zone to fluidized catalytic thermolysis in the upper zone;
    (f) recovering at least a portion of catalyst from the riser reactor;
    (g) regenerating at least a portion of the recovered catalyst;
    (h) feeding a first portion of the regenerated catalyst to a catalyst cooling chamber and a second portion of the regenerated catalyst to the reactor riser upstream from the mixing zone;
    (i) cooling the first portion of the regenerated catalyst in the catalyst cooling chamber to temperature $T_2$; and
    (j) introducing the cooled regenerated catalyst into the upper zone.

2. The process of claim 1, wherein at least one of the following conditions prevail:
    (a) $T_1$ is from about 1100° F. to about 1400° F. and $T_2$ is from about 500° F. to about 1100° F.;
    (b) the difference between $T_2$ and $T_1$ is about 50° F. to about 500° F.;
    (c) the temperature in the mixing zone at the time of introduction of the solid biomass into the mixing zone is between from about 900° F. to about 1400° F.; or
    (d) the first catalyst and the second catalyst are the same.

3. The process of claim 1, wherein the first catalyst and the second catalyst are different catalysts and further wherein the first catalyst and the second catalyst are separable from each other.

4. The process of claim 3, wherein the first catalyst and the second catalyst are of different particle sizes and/or density.

5. The process of claim 1, wherein at least one of the following conditions prevail:
    (i) the catalyst recovered from the riser reactor is a combination of the first catalyst and the second catalyst and further wherein the first catalyst and second catalyst are separated after step (f) and before step (g);
    (ii) the recovered catalyst regenerated in step (g) is the second catalyst and, optionally, the first catalyst;
    (iii) the first portion of the regenerated catalyst fed to the catalyst cooling chamber is the second catalyst;
    (iv) the weight ratio of first catalyst to second catalyst introduced into the riser reactor is between from about 85:15 to about 15:85; or
    (v) the temperature in the mixing zone is controlled by adjusting the ratio of first catalyst to solid biomass introduced into the mixing zone.

6. The process of claim 5, wherein the first catalyst and the second catalyst recovered in step (i) are regenerated in separate regenerators.

7. The process of claim 1, wherein the riser reactor further comprises an uppermost zone above the upper zone.

8. The process of claim 7, wherein the temperature in the uppermost zone is less than the temperature in the upper zone.

9. The process of claim 7, further comprising introducing into the uppermost zone a third catalyst, wherein either (a) the first catalyst, second catalyst and third catalyst are the same; or (b) the third catalyst is different from the first catalyst and/or second catalyst.

10. A process of subjecting solid biomass to thermolysis in a riser reactor having a mixing zone, an upper zone above the mixing zone and an uppermost zone above the upper zone, the process comprising:
    (i) introducing a first solid particulate heated to a temperature of $T_1$ into the mixing zone of the riser reactor;
    (ii) introducing solid biomass into the mixing zone downstream from the first solid particulate;
    (iii) mixing the solid biomass and the first solid particulate in the mixing zone and reacting the solid biomass in the mixing zone to render a mixing zone effluent;
    (iv) introducing the mixing zone effluent into the upper zone, wherein the temperature in the upper zone is cooled by the addition of a cooling media into the upper zone, the cooling media comprising a second solid particulate comprising a solid catalyst and, optionally, a vaporizable liquid, the cooling media having a temperature, $T_2$, wherein $T_2$ is less than $T_1$; and
    (v) subjecting the mixing zone effluent to fluidized catalytic thermolysis in the upper zone;
    wherein the temperature in the uppermost zone is less than the temperature in the upper zone.

11. The process of claim 10, wherein at least one of the following conditions prevail:
    (a) the temperature in the mixing zone during mixing is between from about 900° F. to about 1350° F.;
    (b) $T_1$ is from about 1100° F. to about 1400° F. and $T_2$ is from about 500° F. to about 1100° F.;
    (c) the first solid particulate and the second solid particulate are catalysts;
    (d) the first solid particulate and the second solid particulate are of different sizes and/or density;
    (e) the difference between $T_2$ and $T_1$ is about 50° F. to about 500° F.;
    (f) the temperature in the mixing zone at the time of introduction of biomass into the mixing zone is between from about 900° F. to about 1400° F.;
    (g) the weight ratio of the first solid particulate to catalyst in the cooling media introduced into the riser reactor is between from about 85:15 to about 15:85;

(h) the temperature in the mixing zone is controlled by adjusting the ratio of first solid particulate to biomass introduced into the mixing zone;
(i) the vaporizable liquid is a distillate from a treated bio-oil stream hydrogenated in a hydrotreater;
(j) the vaporizable liquid is ethanol, methanol, butanol, a glycol or a combination thereof; or
(k) the vaporizable liquid is a liquid stream from a fractionator.

12. The process of claim 11, wherein the first solid particulate and the second solid particulate are catalysts and wherein (i) the first solid particulate and the second solid particulate are the same; or (ii) the first solid particulate and the second solid particulate are different catalysts, the first solid particulate and the second solid particulate being separable from each other.

13. The process of claim 10, further comprising removing the first solid particulate and the second solid particulate from the riser reactor and regenerating at least a portion of the first solid particulate and/or second solid particulate.

14. A process for converting solid biomass to hydrocarbons in a riser reactor having a mixing zone and an upper zone above the mixing zone, the process comprising:
   (a) introducing a first solid particulate heated to a temperature of $T_1$ into the mixing zone of the riser reactor
   (b) introducing solid biomass into the mixing zone downstream from the first solid particulate;
   (c) mixing the solid biomass and the first solid particulate in the mixing zone and reacting the mixture in the mixing zone to render a pyrolyzed product;
   (d) introducing the pyrolyzed product to the upper zone and introducing into the upper zone a cooling media having a temperature, $T_2$, wherein $T_2$ is less than $T_1$;
   (e) subjecting the pyrolyzed product to fluidized catalytic thermolysis in the upper zone;
   (f) separating a fluid stream from effluent from the riser reactor; and
   (g) separating an organic-enriched stream and an aqueous stream from the fluid stream wherein the cooling media is:
      i. bio-naphtha separated from the organic-enriched stream; and/or
      ii. light hydrocarbons having a boiling point between from about 150° F. to about 180° F. originating from a topped bio-oil fraction from the organic-enriched stream;
      iii. intermediate hydrocarbons having a boiling point between from about 180° F. to about 420° F. originating from a topped bio-oil fraction from the organic-enriched stream; and/or
      iv. heavy hydrocarbons having a boiling point above 420° F. originating from a topped bio-oil fraction from the organic-enriched stream.

15. The process of claim 14, wherein the temperature in the mixing zone during mixing is between from about 900° F. to about 1350° F.; or $T_1$ is from about 1100° F. to about 1400° F.

16. The process of claim 14, wherein at least one of the following conditions prevail:
   (a) the first solid particulate is a catalyst;
   (b) the difference between $T_2$ and $T_1$ is about 50° F. to about 500° F.
   (c) the temperature in the mixing zone at the time of introduction of said biomass into the mixing zone is between from about 950° F. to about 1400° F.; or
   (d) the temperature in the mixing zone is controlled by adjusting the ratio of said first solid particulate to said solid biomass introduced into the mixing zone.

17. The process of claim 14, further comprising recovering at least a portion of the first solid particulate from the riser reactor and regenerating at least a portion of the recovered first solid particulate.

18. The process of claim 14, wherein the riser reactor further comprises an uppermost zone above the upper zone.

19. A process of subjecting solid biomass to thermolysis in a riser reactor having a mixing zone and an upper zone above the mixing zone, the process comprising:
   (i) introducing into the mixing zone of the riser reactor a first solid particulate heated to a temperature of $T_1$;
   (ii) introducing the solid biomass into the mixing zone downstream from the first solid particulate;
   (iii) mixing the solid biomass and the first solid particulate in the mixing zone and treating the mixture such that at least a portion of the solid biomass is pyrolyzed;
   (iv) introducing into the upper zone a vaporizable material having a temperature, $T_2$ wherein $T_2$ is less than $T_1$;
   (v) subjecting the treated mixture to fluidized catalytic thermolysis in the upper zone and removing effluent containing the converted biomass from the riser reactor;
   (vi) separating the effluent from the catalytic thermolysis into a fluid phase and a solid phase;
   (vii) separating an organic-enriched phase from the fluid phase;
   (viii) separating the organic-enriched phase into a bio-oil containing stream and a distillate stream;
   (ix) separating the vaporizable material from the bio-oil containing stream or distillate stream; and
   (x) introducing the separated vaporizable material into the upper zone of the riser reactor.

20. The process of claim 19, wherein the first solid particulate is sand.

21. The process of claim 19, wherein the first solid particulate is a catalyst.

22. The process of claim 19, wherein the bio-oil containing stream, prior to separation of the vaporizable material therefrom, is subjected to hydrogenation in a hydrotreater and further wherein the vaporizable material is removed from the hydrotreater.

23. The process of claim 22, wherein the vaporizable material from the hydrotreater is heated prior to introducing the vaporizable material into the upper zone of the riser reactor.

24. The process of claim 22, wherein the vaporizable material from the hydrotreater is vacuum gas oil.

25. The process of claim 19, wherein at least one of the following conditions prevail:
   (a) the bio-oil containing stream contains partially converted bio-oil and further wherein the partially converted bio-oil is separated from the bio-oil containing stream and introduced into the riser reactor as the vaporizable material;
   (b) the vaporizable material is butanol;
   (c) the temperature in the mixing zone during mixing is between from about 900° F. to about 1350° F.;
   (d) $T_1$ is from about 1100° F. to about 1400° F. and $T_2$ is from about 500° F. to about 1100° F.;
   (e) the difference between $T_2$ and $T_1$ is about 50° F. to about 500° F.; or
   (f) the temperature in the mixing zone at the time of introduction of biomass into the mixing zone is between from about 950° F. to about 1400° F.

26. The process of claim 19, wherein the first solid particulate is recovered from the solid phase of (vi) and is regenerated in a regenerator.

27. A process of subjecting solid biomass to thermolysis in a riser reactor having a mixing zone and an upper zone above the mixing zone, the process comprising:
- (i) introducing a first solid particulate heated to a temperature of $T_1$ into the mixing zone of the riser reactor;
- (ii) introducing solid biomass into the mixing zone downstream from the first solid particulate;
- (iii) mixing the solid biomass and the first solid particulate in the mixing zone and reacting the solid biomass in the mixing zone to render a mixing zone effluent;
- (iv) introducing the mixing zone effluent into the upper zone, wherein the temperature in the upper zone is cooled by the addition of a cooling media into the upper zone, the cooling media comprising a second solid particulate comprising a solid catalyst and, optionally, a vaporizable liquid, the cooling media having a temperature, $T_2$, wherein $T_2$ is less than $T_1$;
- (v) subjecting the mixing zone effluent to fluidized catalytic thermolysis in the upper zone; and
- (vi) removing the first sold solid particulate and the second solid particulate from the riser reactor and regenerating at least a portion of the first solid particulate and second solid particulate in different regenerators.

28. The process of claim 27, wherein at least one of the following conditions prevail:
- (a) the temperature in the mixing zone during mixing is between from about 900° F. to about 1350° F.;
- (b) $T_1$ is from about 1100° F. to about 1400° F. and $T_2$ is from about 500° F. to about 1100° F.;
- (c) the first solid particulate and the second solid particulate are catalysts;
- (d) the first solid particulate and the second solid particulate are of different sizes and/or density;
- (e) the difference between $T_2$ and $T_1$ is about 50° F. to about 500° F.;
- (f) the temperature in the mixing zone at the time of introduction of biomass into the mixing zone is between from about 900° F. to about 1400° F.;
- (g) the weight ratio of the first solid particulate to catalyst in the cooling media introduced into the riser reactor is between from about 85:15 to about 15:85;
- (h) the temperature in the mixing zone is controlled by adjusting the ratio of first solid particulate to biomass introduced into the mixing zone;
- (i) the vaporizable liquid is a distillate from a treated bio-oil stream hydrogenated in a hydrotreater;
- (j) the vaporizable liquid is ethanol, methanol, butanol, a glycol or a combination thereof; or
- (k) the vaporizable liquid is a liquid stream from a fractionator.

29. The process of claim 28, wherein at least a portion of the regenerated first solid particulate is introduced into the riser reactor upstream from the mixing zone and at least a portion of the regenerated second solid particulate is introduced into the upper zone as the cooling media.

30. The process of claim 28, wherein the first solid particulate and the second solid particulate are catalysts and wherein (i) the first solid particulate and the second solid particulate are the same; or (ii) the first solid particulate and the second solid particulate are different catalysts, the first solid particulate and the second solid particulate being separable from each other.

* * * * *